(12) United States Patent  (10) Patent No.: US 8,293,808 B2
Herrington et al.  (45) Date of Patent: Oct. 23, 2012

(54) FLEXIBLE POLYURETHANE FOAMS PREPARED USING MODIFIED VEGETABLE OIL-BASED POLYOLS

(75) Inventors: Ron Herrington, Brazoria, TX (US); Jeffrey Malsam, Minneapolis, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 10/877,834

(22) Filed: Jun. 25, 2004

(65) Prior Publication Data

US 2005/0070620 A1  Mar. 31, 2005

Related U.S. Application Data

(60) Provisional application No. 60/507,298, filed on Sep. 30, 2003.

(51) Int. Cl.
*C08G 18/28* (2006.01)
(52) U.S. Cl. .......... 521/173; 521/84.1; 521/109.1; 521/117; 521/137; 521/172; 521/174
(58) Field of Classification Search ............. 521/84.1, 521/109.1, 117, 137, 172, 173, 174, 176
See application file for complete search history.

(56) References Cited

U.S. PATENT DOCUMENTS

| | | |
|---|---|---|
| 2,846,408 A | 8/1958 | Brochhagen et al. |
| 3,070,608 A | 12/1962 | Kuester et al. |
| 4,032,468 A | 6/1977 | Treadwell et al. |
| 4,101,470 A | 7/1978 | McEntire |
| 4,375,521 A | 3/1983 | Arnold |
| 4,423,239 A | 12/1983 | Miyazaki et al. |
| 4,508,853 A | 4/1985 | Kluth et al. |
| 4,546,120 A | 10/1985 | Peerman et al. |
| 4,551,517 A | 11/1985 | Herold et al. |
| 4,617,325 A | 10/1986 | Knobel et al. |
| 4,618,630 A | 10/1986 | Knobel et al. |
| 4,742,087 A | 5/1988 | Kluth et al. |
| 4,775,558 A | 10/1988 | Haas et al. |
| 4,806,571 A | 2/1989 | Knobel et al. |
| 4,826,922 A | 5/1989 | Li et al. |
| 4,826,944 A | 5/1989 | Hoefer et al. |
| 4,886,893 A | 12/1989 | Meffert et al. |
| 4,992,484 A | 2/1991 | Taylor |
| 5,026,881 A | 6/1991 | Gruber |
| 5,032,323 A | 7/1991 | Virnig |
| 5,164,124 A | 11/1992 | Lange et al. |
| 5,266,714 A | 11/1993 | Stoll et al. |
| 5,302,626 A | 4/1994 | Hoefer et al. |
| 5,380,886 A | 1/1995 | Daute et al. |
| 5,382,647 A | 1/1995 | Daute et al. |
| 5,403,440 A | 4/1995 | Daute et al. |
| 5,442,082 A | 8/1995 | Uphues et al. |
| 5,482,647 A | 1/1996 | Bolkan et al. |
| 5,482,980 A | 1/1996 | Pcolinsky |
| 5,512,655 A | 4/1996 | Klauck et al. |
| 5,609,722 A | 3/1997 | Rodriguez et al. |
| 5,645,762 A | 7/1997 | Cook et al. |
| 5,688,989 A | 11/1997 | Daute et al. |
| 5,795,949 A | 8/1998 | Daute et al. |
| 6,046,298 A | 4/2000 | Beuer et al. |
| 6,057,375 A | 5/2000 | Wollenweber et al. |
| 6,071,977 A | 6/2000 | Austin et al. |
| 6,107,433 A | 8/2000 | Petrovic et al. |
| 6,180,686 B1 | 1/2001 | Kurth |
| 6,211,315 B1 | 4/2001 | Larock et al. |
| 6,258,869 B1 | 7/2001 | Shah et al. |
| 6,274,750 B1 | 8/2001 | Sato et al. |
| 6,359,023 B1 | 3/2002 | Kluth et al. |
| 6,399,698 B1 | 6/2002 | Petrovic et al. |
| 6,420,443 B1 | 7/2002 | Clark et al. |
| 6,433,121 B1 | 8/2002 | Petrovic et al. |
| 6,433,125 B1 | 8/2002 | Gruetzmacher et al. |
| 6,465,569 B1 | 10/2002 | Kurth |
| 6,495,611 B1 | 12/2002 | Arlt et al. |
| 6,548,609 B2 | 4/2003 | Ramírez-de-Arellano-Aburto et al. |
| 6,573,354 B1 | 6/2003 | Petrovic et al. |
| 6,583,302 B1 | 6/2003 | Erhan et al. |
| 6,610,811 B1 | 8/2003 | Westfechtel et al. |
| 6,649,667 B2 | 11/2003 | Clatty |
| 6,682,673 B1 | 1/2004 | Skwiercz et al. |
| 6,686,435 B1 | 2/2004 | Petrovic et al. |
| 6,864,296 B2 | 3/2005 | Kurth |
| 6,962,636 B2 | 11/2005 | Kurth et al. |
| 6,979,477 B2 | 12/2005 | Kurth et al. |
| 2002/0058774 A1 | 5/2002 | Kurth et al. |
| 2002/0061936 A1 | 5/2002 | Van Heumen et al. |
| 2002/0090488 A1 | 7/2002 | Kurth et al. |
| 2002/0099230 A1 | 7/2002 | Ramirez-de-Arellano-Aburto et al. |
| 2002/0119321 A1 | 8/2002 | Kurth et al. |

(Continued)

FOREIGN PATENT DOCUMENTS

EP  0 125 579  5/1984

(Continued)

OTHER PUBLICATIONS

Colvin, "Low Cost Polyols from Natural Oils," *UTECH Asia '95*, May 1995, Suntec City, Singapore, Paper 36:1-9.

Urethane Soy Systems Company, "Companies Using SoyOyl Biobased Polyols in Their Polyurethane Products," printed from the internet http://www.soyoyl.com/products/applications.asp on Aug. 12, 2002.

International Search Report from PCT/US2005/022580, mailed Oct. 28, 2005, 2 pgs.

Michael L. Berins, Cellular Plastics, Plastics Engineering Handbook of the Society of the Plastics Industry, 1991, pp. 541-565, Fifth edition, Kluwer Academic Publishers.

(Continued)

*Primary Examiner* — John Cooney

(57) ABSTRACT

A flexible polyurethane foam prepared by reacting, in the presence of a blowing agent, a polyisocyanate with an active hydrogen-containing composition that includes a modified vegetable oil-based polyol. The foams exhibit good load-bearing properties, relatively high sag factors, and/or good color retention upon exposure to light.

11 Claims, 3 Drawing Sheets

U.S. PATENT DOCUMENTS

| | | |
|---|---|---|
| 2002/0121328 A1 | 9/2002 | Kurth et al. |
| 2002/0161161 A1 | 10/2002 | Heidbreder et al. |
| 2002/0192456 A1 | 12/2002 | Mashburn et al. |
| 2003/0065201 A1 | 4/2003 | Mahlum |
| 2003/0083394 A1 | 5/2003 | Clatty |
| 2003/0088054 A1 | 5/2003 | Chasar et al. |
| 2003/0105178 A1 | 6/2003 | Kurth |
| 2003/0143910 A1 | 7/2003 | Mashburn et al. |
| 2003/0149214 A1 | 8/2003 | Westfechtel et al. |
| 2003/0191273 A1 | 10/2003 | Gertzmann et al. |
| 2003/0191274 A1 | 10/2003 | Kurth et al. |
| 2004/0082712 A1 | 4/2004 | Blount |
| 2004/0209971 A1 * | 10/2004 | Kurth et al. ............ 521/155 |
| 2005/0124709 A1 | 6/2005 | Krueger et al. |
| 2005/0131092 A1 | 6/2005 | Kurth et al. |
| 2005/0182228 A1 | 8/2005 | Kurth et al. |
| 2006/0030632 A1 | 2/2006 | Krueger et al. |
| 2006/0041155 A1 | 2/2006 | Casper |
| 2006/0041156 A1 | 2/2006 | Casper et al. |
| 2006/0041157 A1 | 2/2006 | Petrovic et al. |

FOREIGN PATENT DOCUMENTS

| | | |
|---|---|---|
| EP | 0 127 810 | 5/1984 |
| EP | 0 340 587 | 4/1989 |
| EP | 0 361 080 | 8/1989 |
| EP | 0 432 208 | 8/1989 |
| EP | 0 553 127 | 4/1992 |
| EP | 0 554 590 | 9/1992 |
| EP | 0 759 043 | 5/1995 |
| EP | 0 600 958 | 3/1996 |
| GB | 2 428 677 | 2/2007 |
| JP | 2004-244443 | 9/2004 |
| SG | 55223 | 12/1998 |
| WO | 92/07017 | 4/1992 |
| WO | WO 92/11251 | 7/1992 |
| WO | WO9531493 | 11/1995 |
| WO | 97/07017 | 2/1997 |
| WO | 97/21748 | 6/1997 |
| WO | WO 00/73368 | 12/2000 |
| WO | 01/25184 | 4/2001 |
| WO | 01/70842 | 9/2001 |
| WO | WO 02/10247 | 2/2002 |
| WO | WO 03/029182 | 4/2003 |
| WO | 03/078493 | 9/2003 |
| WO | 2004/020497 | 3/2004 |
| WO | 2004/063245 | 7/2004 |
| WO | 2004/071281 | 8/2004 |
| WO | 2004/096882 | 11/2004 |
| WO | 2004/096883 | 11/2004 |
| WO | 2005/000934 | 1/2005 |
| WO | 2005/003202 | 1/2005 |
| WO | 2005/078000 | 8/2005 |
| WO | 2005/123798 | 12/2005 |
| WO | 2006/012344 | 2/2006 |
| WO | 2006/047431 | 5/2006 |
| WO | 2006/047432 | 5/2006 |
| WO | 2006/047433 | 5/2006 |
| WO | 2006/047434 | 5/2006 |
| WO | 2006/065345 | 6/2006 |
| WO | 2006/071549 | 7/2006 |
| WO | 2006/116456 | 11/2006 |
| WO | 2006/118995 | 11/2006 |
| WO | 2007/019051 | 2/2007 |
| WO | 2007/019063 | 2/2007 |

* cited by examiner

FLEXIBLE POLYURETHANE FOAMS PREPARED USING MODIFIED VEGETABLE OIL-BASED POLYOLS

STATEMENT OF PRIORITY

This application derives priority from a Provisional Application filed Sep. 30, 2003 bearing Ser. No. 60/507,298 and entitled "Flexible Polyurethane Foams Having Good Load-Bearing Properties," which is hereby incorporated by reference.

TECHNICAL FIELD

This invention relates to preparing flexible polyurethane foams.

BACKGROUND

Flexible polyurethane foams are commonly made by reacting petroleum-based polyols or polyol compositions with organic polyisocyanates in the presence of catalysts, blowing agents and other optional ingredients. Since the 1960's, flexible polyurethane foams have been used as a cushioning, loadbearing, and comfort-providing component of automotive, transportation, and other seating designs. To meet the widely varying requirements of various seat designs, it is necessary for the commercial flexible foam producers to have technology that allows them to easily and economically vary the hardness of the flexible foams they produce.

Hardness and loadbearing are two terms that the flexible foam industry often interchanges. Both terms should be understood to relate to the same, weight supporting, physical characteristic of a flexible polyurethane foam.

The ability of a flexible polyurethane foam to receive and support a weight is commonly defined as its loadbearing capacity. Quantification of this property is done in an *Indentation Force Deflection* (IFD) test following the guidelines of standardized procedures such as in ASTM D 3574, Test $B_1$.

A wide variety of techniques for varying foam hardness exist. The most commonly used among these techniques involve varying the foam's density, isocyanate index, and/or polyol functionality, and the use of copolymer polyols, with copolymer polyols being the most useful. Copolymer polyols typically consist of a polyether polyol serving as a carrier liquid for millions of tiny, typically styrene/acrylonitrile-containing particles. Special additive molecules and process steps are necessary to produce a stable dispersion of the particles. In the final polyurethane foam, these added particles function as a classical filler and are a convenient way to adjust the hardness or loadbearing capability of the flexible foams.

Although copolymer polyols are capable of varying foam hardness, they exhibit a number of disadvantages. These disadvantages include variations in the weight percent of suspended solids, the viscosity of the neat product, and product color. Variations in these features lead to lot-to-lot performance differences when using copolymer polyols in a production environment. In addition, a common industrial problem with using copolymer polyols is the plugging of filters located at key points in a foam production plant. The filters are there to catch any trash arising from normal shipping and handling operations. Even though copolymer polyols are quoted as having particles designed to be in the range of 1 micron in size, it is common for any given shipment of product to plug 100 micron and even larger size filters.

SUMMARY

Flexible polyurethane foams are described that are prepared by reacting a polyisocyanate with an active hydrogen-containing composition (i.e., a composition that includes reactants having hydrogen atom-containing groups capable of reacting with an isocyanate group) in the presence of a blowing agent. The active hydrogen-containing composition, in turn, includes a modified vegetable oil-based polyol. A "modified vegetable oil-based polyol," as used herein, refers to a non-naturally occurring polyol prepared by treating a vegetable oil so as to modify the chemical structure of the vegetable oil, thereby yielding the polyol. Preferably, the treatment involves modifying the double bond(s) of the vegetable oil.

The hydroxyl groups of the modified vegetable oil-based polyol chemically react with the isocyanate groups to form urethane linkages. Thus, the polyol is chemically incorporated into the polyurethane polymer. The BVT Reactivity Test, described in greater detail, below, may be used to assess the extent of reaction between the hydroxyl groups and the isocyanate groups. Preferably, the polyol is characterized such that when it is combined with a catalyst and toluene diisocyanate to form a reaction mixture according to the protocol outlined in the BVT Reactivity Test, the reaction mixture has a viscosity of at least 5,000 mPa·s (more preferably at least 10,000 mPa·s, and, even more preferably, at 20,000 mPa·s), measured 600 seconds after the formation of the reaction mixture.

These foams offer a number of advantages. For example, in some embodiments the foams exhibit good load bearing capability at a relatively low polyol loading, as reflected in the load efficiency number (which typically is at least 4 Newtons/part modified vegetable oil-based polyol, and in some embodiments may be at least 7 or at least 10 Newtons/part modified vegetable oil-based polyol). The load efficiency number is calculated according to the procedure described in Van Heumen et al., WO 02/10247, using loadbearing data from the 65% indentation force deflection. Preferably, the foams have a load efficiency number that is at least as high as the load efficiency number of a polyurethane foam prepared by substituting an equal amount of a copolymer polyol for the modified vegetable oil-based polyol. The foams also preferably have a hardness value that is greater than the hardness value of a control foam prepared using an active hydrogen-containing composition that lacks the modified vegetable oil-based polyol.

Active hydrogen-containing compositions used to prepare foams that include the modified vegetable oil-based polyol in combination with a polyether-based polyol, polyester-based polyol, or combination thereof, have suitably low viscosities that facilitate handling and processing. Preferably the viscosity of the active hydrogen-containing composition is lower than the viscosity of a comparable active hydrogen-containing composition in which a copolymer polyol is substituted for the modified vegetable oil-based polyol.

The active hydrogen-containing compositions also are clear, rather than undesirably opaque. For example, when 1-49 parts by weight of the modified vegetable oil-based polyol are combined with 99-51 parts by weight of a polyether-based polyol having a hydroxyl number less than 120, a stable liquid (i.e., a liquid that is optically clear to the naked eye) is formed at 23° C. In addition, the active hydrogen-containing compositions preferably remain stable at 23° C. for extended periods of time. Furthermore, the active hydrogen-containing compositions are preferably free of particles having a size greater than 0.1 micron.

Another useful attribute of the foams is their color fastness, which refers to their ability to retain their as-manufactured white color over extended periods of time upon exposure to light under ambient conditions. Preferably, the foams, upon exposure to light under ambient conditions for a period of 6 weeks in the absence of an ultraviolet stabilizer, have a reflectance specular included color characterized by an (L) value of at least 70 units, a (b) value of no greater than 25 units, and, preferably, an (a) value of no greater than 4 units, measured according to the protocol described in the Examples section, below. In addition, the foams, upon manufacture, preferably have (L), (a), and (b) values meeting the enumerated values, and these values do not change substantially upon exposure to light under the conditions described above. In particular, the (L) and (b) values do not change by more than 14 units, and the (a) value does not change by more than 5 units.

The foams exhibit an odor that is at least as good as, if not better, than the odor associated with equivalent foams prepared using a copolymer polyol, rather than the modified vegetable oil-based polyol. In addition, the foams are environmentally friendly because the modified vegetable oil-based polyols are derived from renewable, natural sources, rather than petroleum sources.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
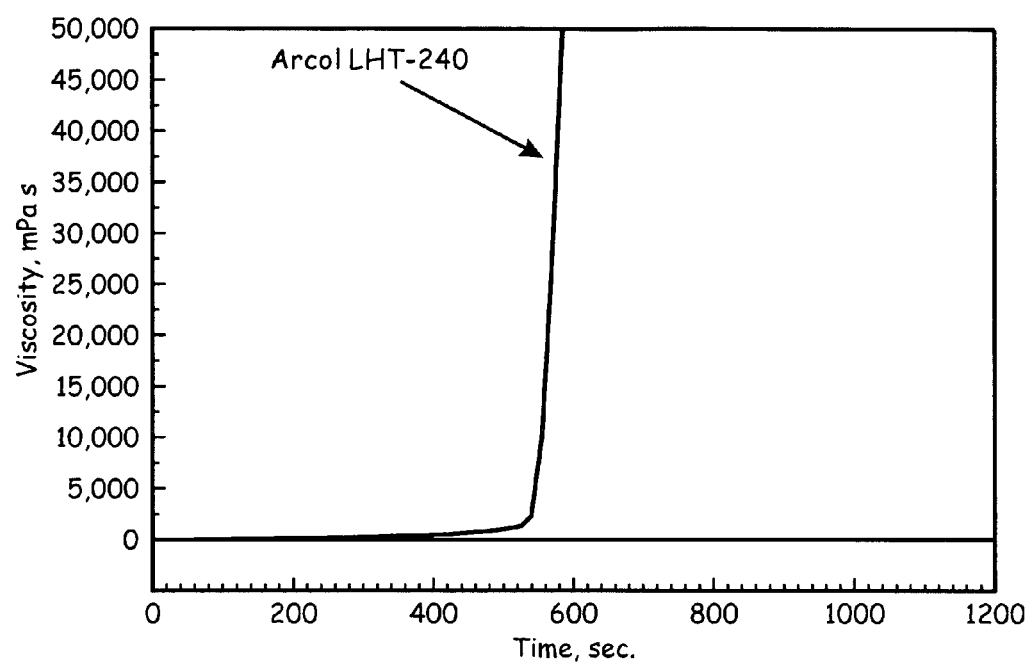
FIG. 1 is a graph showing the results of BVT reactivity testing for a petroleum-based polyol (Arcol® LHT-240).

Flexible polyurethane foams are prepared by reacting a polyisocyanate with an active hydrogen-containing composition that includes a modified vegetable oil-based polyol. More than one type of modified vegetable oil-based polyol may be included in the composition. In addition, the composition may contain one or more non-vegetable oil-based polyols such as copolymer polyols, polyether-based polyols, polyester-based polyols, and the like, as well as dendritic macromolecules. The reaction is conducted in the presence of a blowing agent and, optionally, a catalyst.

The amount of modified vegetable oil-based polyol included in the active hydrogen-containing composition is selected based upon the desired performance characteristics of the foam. In general, for applications in which it is desired to increase the load-bearing ability of the foam, the composition preferably includes 0.5 to 50 parts by weight of the modified vegetable oil-based polyol per 100 parts of active hydrogen-containing material. Also useful for load-bearing purposes are compositions where the amount of modified vegetable oil-based polyol ranges from 1 to 40, or from 2 to 30, parts by weight per 100 parts of active hydrogen-containing material.

Useful modified vegetable oil-based polyols include polyols prepared by providing an epoxidized vegetable oil (which may be prepared by reacting a peroxyacid with the vegetable oil), and then combining the epoxidized vegetable oil with an alcohol, a catalytic amount of fluoroboric acid, and, optionally, water to form the polyol. Such polyols contain all secondary hydroxyl groups. Essentially all of the double bonds of the vegetable oil may be epoxidized. Examples of such preparations are described, for example, in Petrovic et al., U.S. Pat. No. 6,686,435; Petrovic et al., U.S. Pat. No. 6,107,433; Petrovic et al., U.S. Pat. No. 6,573,354; and Petrovic et al., U.S. Pat. No. 6,433,121, each of which is hereby incorporated by reference. Alternatively, the epoxidation reaction may be conducted under conditions that result in a polyol having residual double bonds.

These polyols may be used directly to produce polyurethane foams. Alternatively, they may be reacted with the epoxidized vegetable oils described above in the presence of a fluoroboric acid catalyst and, optionally, water to form a polyol suitable for the preparation of polyurethane foams.

Also suitable are modified vegetable-oil based polyols prepared by a hydroformylation process. In this process, a vegetable oil is reacted with carbon monoxide and hydrogen in the presence of a Group VIII metal catalyst (e.g., a rhodium catalyst) to form a hydroformylated vegetable oil. The hydroformylated vegetable oil is then hydrogenated to form the modified vegetable oil-based polyol. This process produces polyols containing all primary hydroxyl groups. These polyols may be used directly to produce polyurethane foams. Alternatively, they may be reacted with the epoxidized vegetable oils described above in the presence of a fluoroboric acid catalyst and, optionally, water to form a polyol suitable for the preparation of polyurethane foams.

Examples of suitable vegetable oils include soybean oil, safflower oil, linseed oil, corn oil, sunflower oil, olive oil, canola oil, sesame oil, cottonseed oil, palm oil, rapeseed oil, tung oil, fish oil, peanut oil, and combinations thereof. Also useful are partially hydrogenated vegetable oils and genetically modified vegetable oils, including high oleic safflower oil, high oleic soybean oil, high oleic peanut oil, high oleic sunflower oil, and high erucic rapeseed oil (crambe oil).

Useful polyisocyanates have an average of at least about 2.0 isocyanate groups per molecule. Both aliphatic and aromatic polyisocyanates can be used. Examples of suitable aliphatic polyisocyanates include 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate, 1,5-diisocyanato-3,3,5-trimethylcyclohexane, hydrogenated 2,4- and/or 4,4'-diphenylmethane diisocyanate ($H_{12}MDI$), isophorone diisocyanate, and the like. Examples of suitable aromatic polyisocyanates include 2,4-toluene diisocyanate (TDI), 2,6-toluene diisocyanate (TDI), and blends thereof, 1,3- and 1,4-phenylene diisocyanate, 4,4'-diphenylmethane diisocyanate (including mixtures thereof with minor quantities of the 2,4'-isomer) (MDI), 1,5-naphthylene diisocyanate, triphenylmethane-4,4',4''-triisocyanate, polyphenylpolymethylene polyisocyanates (PMDI), and the like. Derivatives and prepolymers of the foregoing polyisocyanates, such as those containing urethane, carbodiimide, allophanate, isocyanurate, acylated urea, biuret, ester, and similar groups, may be used as well.

The amount of polyisocyanate preferably is sufficient to provide an isocyanate index of about 60 to about 120, preferably about 70 to about 110, and, in the case of high water formulations (i.e., formulations containing at least about 5 parts by weight water per 100 parts by weight of other active hydrogen-containing materials in the formulation), from about 70 to about 90. "Isocyanate index" refers to 100 times the ratio of isocyanate groups to active hydrogen groups in the reaction mixture.

The blowing agent generates a gas under the conditions of the reaction between the polyol and the polyisocyanate. Suitable blowing agents include water, liquid carbon dioxide, acetone, and pentane, with water being preferred.

The blowing agent is used in an amount sufficient to provide the desired foam density. For example, when water is used as the sole blowing agent, from about 0.5 to about 10, preferably from about 1 to about 8, more preferably from about 2 to about 6 parts by weight, are used per 100 parts by weight of other active hydrogen-containing materials in the formulation.

Other additives that may be included in the formulation include surfactants, catalysts, cell size control agents, cell opening agents, colorants, antioxidants, preservatives, static dissipative agents, plasticizers, crosslinking agents, flame retardants, and the like.

Examples of useful surfactants include silicone surfactants and the alkali metal salts of fatty acids. The silicone surfactants, e.g., block copolymers of an alkylene oxide and a dimethylsiloxane, are preferred, with "low fog" grades of silicone surfactants being particularly preferred.

Examples of useful catalysts include tertiary amine compounds and organometallic compounds. Specific examples of useful tertiary amine compounds include triethylenediamine, N-methylmorpholine, N-ethylmorpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously used in an amount from about 0.01 to about 5, preferably from about 0.05 to about 2 parts per 100 parts by weight of the active hydrogen-containing materials in the formulation.

Specific examples of useful organometallic catalysts include organic salts of metals such as tin, bismuth, iron, zinc, and the like, with the organotin catalysts being preferred. Suitable organotin catalysts include dimethyltindilaurate, dibutyltindilaurate, stannous octoate, and the like. Other suitable catalysts are taught, for example, in U.S. Pat. No. 2,846,408, which is hereby incorporated by reference. Preferably, about 0.001 to about 1.0 parts by weight of an organometallic catalyst is used per 100 parts by weight of the active hydrogen-containing materials in the formulation.

Blends of catalysts may also be used.

In some cases, a static dissipative agent may be included in the formulation during foam preparation, or used to treat the finished foam. Useful examples include non-volatile, ionizable metal salts, optionally in conjunction with an enhancer compound, as described in U.S. Pat. Nos. 4,806,571, 4,618,630, and 4,617,325. Of particular interest is the use of up to about 3 weight percent of sodium tetraphenylboron or a sodium salt of a perfluorinated aliphatic carboxylic acid having up to about 8 carbon atoms.

Both free-rise (slabstock) and molding techniques can be used to prepare the foam. In slabstock processes, the reactants are mixed and poured onto a conveyor where the reacting mixture rises against its own weight and cures. In the molding process, the reactants are mixed and dispensed into a mold where they react, filling the mold and assuming the shape of the mold cavity.

It is often desirable to post-cure the foam after initial foaming (and demolding in the case of molded foams) to develop optimal physical properties. Post curing can be done under ambient conditions for a period of about 12 hours to seven days, or under elevated temperatures for a period of about 10 minutes to about 3 hours.

In some cases, it may be desirable to open the cell walls of the foam mechanically. This is most conveniently done by any of the known crushing techniques.

In some cases, it is desirable to prepare foams having two or more areas having different hardness values. One or both of the areas may comprise the above-described flexible polyurethane foams prepared using modified vegetable oil-based polyols.

The product foams exhibit good mechanical properties, including density, tensile strength, tear strength, and elongation at break. In general, foam densities range from 8 to 160 $kg/m^3$, preferably from 12 to 128 $kg/m^3$, and more preferably from 16 to 80 $kg/m^3$. The particular density value is selected based upon the application for which the foam is intended.

The foams may be used in a variety of applications. For example, the foams may be incorporated in seat components (e.g., seat cushions, seat backs, or both) for use in motor vehicles or in furniture. In the case of seat components for use in motor vehicles, multiple hardness foams are particularly useful. Other examples of applications for the foam include carpet underlays, mattresses, and flexible packaging foams.

EXAMPLES

Abbreviations

The following abbreviations are used throughout this section:

B-Side Masterbatch—The premixture of polyol(s), surfactant(s), crosslinker(s), catalyst(s), additive(s) and blowing agent(s) that will be later combined with a desired polyisocyanate to initiate a foam producing reaction.

BVT—An abbreviation for the words Brookfield Viscosity Test. This test is a simple and convenient way to compare the gellation reactivity characteristics of various polyols with a polyisocyanate of interest.

CPP—An abbreviation for the words copolymer polyol.

CS—An abbreviation for the words compression set.

Foam Odor—In some cases, immediately after demolding and hand crushing, each foam was rated for its odor characteristics. A normal rating was assigned to foams exhibiting an odor no different from that normally expected from freshly prepared foam using conventional technology. In other examples, the foam sometimes took on a notable odor that could be traced back to the particular polyol being used. A rating of mild was assigned to those foams having a notably different but not objectionable level of odor. A rating of strong indicates that the odor was different and present at such a level that most observers would object to it.

In other cases, foam odor was assessed according to the SAE J1351 protocol, described below in the "Odor Testing" section.

Foam Tightness—A subjective assessment of how closed cell or open cell a foam appears to be immediately after it is demolded. Tightness infers that the foam is more closed cell than open. The more closed cell a foam is, the tighter it is said to be and this has implications for how easily it will tear during the demold event and how much compressive pressure will be needed to mechanically crush open the foam cells to avoid shrinkage as the foam cools down.

HACS—An abbreviation for the words humid aged compression set.

Hand Crushing—The physical act of placing ones hands on the show surface of a freshly demolded foam pad and repeatedly stroking the foam up and down to cause rupture of any closed cell windows that may be present in the foam. The action is repeated across the entire surface of the pad to ensure uniformity in the various sections of the pad.

Load Efficiency Number—A number calculated as in WO 02/10247 to aid in deciding which candidate method of adjusting foam hardness is more efficient. The load efficiency rating is defined as the number of Newtons of foam hardness increase per part by weight of load enhancing material added. Reference to a base or control formulation containing no load adjusting additive is necessary for proper calculation of the rating.

Loadbearing Characteristics—A collective term used to refer to the results found in testing the loadbearing capacity of a flexible foam. The normally reported data include the 25 and 65% indentation force deflection values.

Sag Factor—A number calculated as the ratio of the 65% indentation force deflection value to the 25% indentation force deflection value.

Materials

The following materials were used in the Examples:

Arcol® F-3022—a petroleum-based, nominal 3000 molecular weight polyether triol made by the addition of propylene oxide and ethylene oxide to a glycerine-based initiator compound. Typical features of the commercially available product include a water-white color, terminal hydroxyls that are all secondary in nature, a hydroxyl number of approximately 56, and a 25° C. viscosity in the range of 480 mPa s. The material reveals a very mild and characteristic polyether polyol odor. This material is available from Bayer Corporation.

Arcol® LHT-240—a petroleum-based, nominal 700 molecular weight polyether triol made by the addition of propylene oxide to a glycerine-based initiator compound. Typical features of the commercially available product include a water-white color, terminal hydroxyls that are all secondary in nature, a hydroxyl number of approximately 238, and a 25° C. viscosity in the range of 250 mPa s. The material reveals a very mild and characteristic polyether polyol odor. This material is available from Bayer Corporation.

Chem-Trend PRC-7166—A solvent-based, proprietary mold release composition available from Chem-Trend Corporation.

Dabco® BL-11—A commercial catalyst product from Air Products Corporation consisting of a 70 weight % solution of bis (dimethylaminoethyl) ether in dipropylene glycol. Typically used as a catalyst for the blowing reaction.

Dabco® DC-5169—A commercial surfactant product from Air Products Corporation.

Dabco® 33-LV—A commercial catalyst product from Air Products Corporation consisting of a 33 weight % solution of triethylene diamine in dipropylene glycol. Typically used as a polymerization or gelling catalyst.

DEOA—Diethanol amine. A pure, commercial grade from Huntsman was used as a foam stabilizing crosslinker in this work.

Hyperlite® E-848 Polyol—A petroleum-based, high-functionality type polyether polyol made by adding propylene oxide to a proprietary initiator compound to reach an intermediate molecular weight and then capping with ethylene oxide so that the final product has improved reactivity due to its increased functionality and the presence of primary hydroxyls. Typical features of the material include a very light straw color, a functionality of 3.8, a hydroxyl number of approximately 31.5 and a 25° C. viscosity in the range of 1100 mPa s. The material reveals a very mild and characteristic polyether polyol odor. This material is commercially available from the Bayer Corporation.

Hyperlite® E-849 Copolymer Polyol—A petroleum-based polyether polyol containing nominally 41 weight percent of dispersed and stabilized styrene/acrylonitrile containing copolymer particles. Typical features of the material include an off-white color, a hydroxyl number of approximately 18 and a 25° C. viscosity in the range of 6500 mPa s. The material reveals a mild and characteristic copolymer polyol odor. This material is commercially available from the Bayer Corporation.

Niax® D-19—A tin-based gelling catalyst available from GE Silicones-OSI Specialties, Inc.

Niax® Y-10184—A silicone-based surfactant available from GE Silicones-OSI Specialties, Inc. The product is designed for use in making flexible molded polyurethane foams.

Polyol A—For the examples below, this material is Hyperlite® E-849 copolymer polyol.

Polyol B—For the examples below, this material is Arcol® LHT-240 polyol.

Polyol C—For the examples below, this material is SoyOyl® GC5N polyol.

Polyol D—For the examples below, this material is SoyOyl® P38N polyol.

Polyol E—A modified soybean oil-based polyol prepared according to the procedure described in Example 6 of Petrovic, U.S. Pat. No. 6,433,121. Typical features of the product include positive reactivity with isocyanate compounds, terminal hydroxyls that are secondary in nature, a hydroxyl functionality of 3.8, a hydroxyl number of 200 and a 25° C. viscosity in the range of 12,000 mPa s. The product is a light straw in color and reveals a very mild and characteristic odor.

Polyol F—A modified soybean oil-based polyol prepared as described below. The polyol contains unreacted double bonds. Typical features of the product include positive reactivity with isocyanate compounds, terminal hydroxyls that are secondary in nature, a hydroxyl number of 192, and a 25° C. viscosity in the range of 5,500 mPa s. The product is a light straw in color and reveals a very mild and characteristic odor.

Polyol G—A modified soybean oil-based polyol prepared according to the process described below. Typical features of the product include positive reactivity with isocyanate compounds, terminal hydroxyls that are primary in nature, a hydroxyl functionality of 4.5, a hydroxyl number of 220, and a 25° C. viscosity in the range of 14,000 mPa s. The product is light in color and reveals a very mild and characteristic odor.

Polyol H—A modified soybean oil-based polyol prepared according to the process described below. Typical features of the product include positive reactivity with isocyanate compounds, terminal hydroxy groups that are all secondary in nature, a hydroxyl number of 89, and a 25° C. viscosity in the range of 2,300 mPa s. The product is a straw color and reveals a mild and characteristic odor.

SoyOyl® GC5N—A biobased polyol designed for semi-flexible and rigid foam applications, commercially offered by Urethane Soy Systems Company. Typical reported features of the product include a functionality of 3, a hydroxyl number of 275 and a 25° C. viscosity of 2,700 mPa s. The product is noted to contain significant levels of added glycerine and sucrose. The material is amber in color and reveals a strong odor suggestive of soybean oil.

SoyOyl® P38N—A biobased polyol designed for flexible foam applications, commercially offered by Urethane Soy Systems Company. Typical reported features of the product include a functionality of 2, a hydroxyl number of 53 and a 25° C. viscosity of 2,800 mPa s. The material is amber in color and reveals a strong odor suggestive of soybean oil.

Tegostab® B-2370—A commercial surfactant product from Degussa AG designed for conventional slabstock foam use.

Tegostab® B-4690 LF—A low fogging grade of surfactant commercially available from Degussa AG.

Toluene Diisocyanate—In this work, a commercially obtained sample of the 80/20 blend of the 2,4 and 2,6 isomers of toluene diisocyanate was used. The material was from the Bayer Corporation and was identified as Grade A of their Mondur® TD-80 product.

Water—A commercially purchased grade of distilled water was used as an indirect blowing agent.

Polyol Syntheses

1. Polyol F

The preparation of modified soybean oil-based Polyol F began with the experimental setup of a 2 liter, 3-neck, round bottom flask equipped with temperature control, an addition funnel, reflux condenser and stirrer. To this reactor system was added 500 grams (2.5 moles of double bonds) of soybean oil commercially purchased from the Archer Daniels Midland Company as the RBD grade and having an Iodine Value of 127 mg $I_2$/100 g and a viscosity of 60 mPa s.

Also added to the reactor was 75 grams of glacial acetic acid (1.25 moles) and 6.36 grams of a 50% solution of sulfuric acid (0.0325 moles) in water. These ingredients were thoroughly mixed while the reactor system was brought up to a temperature of 70° C. After attaining the temperature set point, 243 grams of a 35% solution of hydrogen peroxide in water (Aldrich catalog number 34,988-7) was added from the dropping funnel over a period of 30 minutes while maintaining the 70° C. temperature set point and vigorous stirring. After an additional 4.5 hours of reaction time, the contents of the reactor system were transferred to a 2 liter separatory funnel and allowed to cool down. During the cool down period, the water and crude partially epoxidized soybean oil separated into two layers.

Product work-up continued by draining off this first water layer and then water washing the crude partially epoxidized soybean oil layer three separate times with 1 liter aliquots of distilled water. The washed partially epoxidized soybean oil was then isolated again and 40 grams of a basic ion exchange resin (Lewatite MP-64 from Bayer) was added. This mixture was allowed to stir for 2 hours to allow neutralization of any remaining acid. The product was then filtered to remove the ion exchange resin and subjected to a low vacuum to remove residual water. A final partially epoxidized soybean oil product was obtained having an iodine value of 25.6 mg $I_2$/100 g and an epoxy oxygen content number of 5.4%.

The preparation of modified soybean oil-based Polyol F continued with the cleaning and resetting of the same reactor system described above. To the reactor was now added 330 grams (10.33 moles) of methanol, 83 grams (4.59 moles) of water and 6.731 grams of tetrafluoroboric acid (as a 48% mixture with water, available as catalog number 20,793-4 from Aldrich).

These ingredients were thoroughly mixed while the reactor system was brought to boiling. Then 510 grams (1.72 moles of epoxy groups) of the partially epoxidized soybean oil prepared above was quickly added to the vigorously stirred reactor.

After an additional 60 minutes of reaction time, 100 grams of a basic ion exchange resin (Lewatite MP-64 from Bayer) was added to neutralize acids. This mixture was stirred for 1 hour and then allowed to cool down. Product recovery continued by filtering off the solid ion exchange resin and removal of residual water and alcohol by vacuum distillation. The final recovered modified soybean oil-based polyol was a light straw in color and had a hydroxyl number of 192 mg KOH/g and a 25° C. viscosity of 5,500 mPa s.

2. Polyol G

The preparation of modified soybean oil-based Polyol G began with the experimental setup of a 500 milliliter, stainless steel, high-pressure reactor. This reactor was equipped with temperature control, an addition port for gas and stirrer. To this reactor system was added 100 grams (0.512 moles of double bonds) of soybean oil commercially purchased from the Archer Daniels Midland Company as the RBD grade and having an Iodine Value of 127 mg $I_2$/100 g and a viscosity of 60 mPa s.

Also added to the reactor was 0.129 grams (0.0005 moles) of rhodium dicarbonyl acetyl acetonate and 0.66 grams (0.0025 moles) of triphenyl phosphine. The reactor was closed up and these ingredients were thoroughly mixed while the reactor system was flushed with three volumes of a synthetic gas mixture consisting of an equal molar ratio of hydrogen and carbon monoxide. The reactor was then pressurized to 13.4 mPa with the same gas composition.

Stirring continued, and over a period of 25 minutes the reactor system was brought to a temperature of 90° C. The reaction was allowed to continue at these conditions for an additional 2 hours. The reactor temperature was then reduced to 70° C., the gas pressure released and the reactor again flushed with three volumes of pure hydrogen gas.

The reactor was then pressurized to 3.4 mPa with the hydrogen gas, sealed, stirred, heated to 130° C. and maintained at those conditions for 30 minutes to deactivate the rhodium-based catalyst.

After cooling the reactor to 30° C. and releasing the gas pressure, the reactor was opened up and 9 grams of Raney nickel and 50 milliliters of isopropanol were charged into the reactor. The system was resealed, flushed with three volumes of hydrogen gas and then pressurized to 4.1 mPa with the hydrogen gas. Stirring was initiated and the temperature raised to 110° C. The reaction was allowed continue over 5 hours under a maintained hydrogen pressure of 3 to 5 mPa.

The reactor was then allowed to cool to room temperature and the gas pressure was released. Product recovery consisted of filtering the reactor contents through Celite and removing the residual solvent by vacuum distillation. The final recovered modified soybean oil-based polyol was a light brown liquid having a hydroxyl number of 220 mg KOH/g and a 25° C. viscosity of 14,000 mPa s.

3. Polyol H

The preparation of modified soybean oil-based Polyol H began with the experimental setup of a 5 liter, 3-neck, round bottom flask equipped with temperature control, an addition funnel, reflux condenser and stirrer. To this reactor system was added 1500 grams of soybean oil commercially purchased from the Archer Daniels Midland Company as the RBD grade and having an Iodine Value of 131 mg $I_2$/100 g and a viscosity of 62 mPa s.

Also added to the reactor was 225 grams of glacial acetic acid and 19 grams of a 50% solution of sulfuric acid in water. These ingredients were thoroughly mixed while the reactor system was brought up to a temperature of 70° C. After attaining the temperature set point, 729 grams of a 35% solution of hydrogen peroxide in water (Aldrich catalog number 34,988-7) was added from the dropping funnel over a period of 30 minutes while maintaining the 70° C. temperature set point and vigorous stirring. After an additional 45 minutes of reaction time, the contents of the reactor system were transferred to a 3 liter separatory funnel and allowed to cool down. During the cool down period, the water and crude partially epoxidized soybean oil separated into two layers.

Product work-up continued by draining off this first water layer and then water washing the crude partially epoxidized soybean oil layer three separate times with 1 liter aliquots of distilled water. The washed partially epoxidized soybean oil was then isolated again and 100 grams of a basic ion exchange resin (Lewatite MP-64 from Bayer) was added. This mixture was stirred for 2 hours to allow neutralization of any remaining acid. The product was then filtered to remove the ion exchange resin and subjected to a low vacuum to remove residual water. A final partially epoxidized soybean oil product was obtained having an iodine value of 88 mg $I_2$/100 g and an epoxy oxygen content number of 1.89%.

The preparation of modified soybean oil-based Polyol H continued with the experimental setup of a 1 liter, 3-neck, round bottom flask equipped with temperature control, an addition funnel, reflux condenser and stirring. To the reactor was added 63 grams of a modified soybean oil-based polyol previously prepared by a hydroformylation technique similar to that described for making Polyol G above. For the particular hydroformylated type polyol used here, the reaction was carried out exactly as for Polyol G with the exception of using cobalt carbonyl as catalyst in place of the rhodium dicarbonyl acetyl acetonate. Also added to the reactor was 0.5 grams of tetrafluoroboric acid (as a 48% mixture with water).

These ingredients were thoroughly mixed while the reactor system was brought to 100° C. Then 150 grams of the partially epoxidized soybean oil prepared above for this synthesis of Polyol H was quickly added to the vigorously stirred reactor.

After an additional 40 minutes of reaction time, the system was cooled down to 50° C. and 10 grams of a basic ion exchange resin (Lewatite MP-64 from Bayer) was added to neutralize acids. This mixture was stirred for 1 hour and then filtered to remove the ion exchange resin. Product recovery continued with removal of residual water by vacuum distillation. The final recovered modified soybean oil-based polyol was a light straw in color and had a hydroxyl number of 89 mg KOH/g and a 25° C. viscosity of 2,300 mPa s.

Gellation Reactivity Of Polyols

The potential gellation reactivity of polyols was evaluated using the BVT Reactivity Test. This simple viscosity growth test is a convenient way to compare the reactivity characteristics of various polyols in a model gellation reaction with toluene diisocyanate. To determine the gellation reactivity characteristics of a polyol, a convenient size sample of the polyol (typically 100 grams) is placed into a 125 milliliter, wide mouth glass bottle. To this bottle is added via an accurate glass syringe, 0.25 cubic centimeters of Dabco® 33-LV catalyst. The contents of the bottle are then stirred at 1000 RPM for 30-seconds using any lab-duty electric stirrer equipped with a Jiffy Mixer brand, Model LM, mixing blade.

After stirring in the catalyst, an amount of toluene diisocyanate equivalent to a 105 index is added and the bottle once again stirred for 30 seconds on the same mixing equipment mentioned above. At the end of the 30 seconds mix, the bottle is removed from the stirrer, placed on the viscometer and the viscosity growth recorded over a 20-minute period. With properly dried samples, no foam formation is involved and the test is presumed to measure just the events related to the polymer forming or gellation reaction. The collected time and viscosity data are conveniently plotted with any computer spreadsheet or graphics program to give a fingerprint BVT Reactivity Curve for the polyol being tested. The major factors influencing the position and shape of the reactivity curve include the molecular weight and functionality of the polyol, the presence of secondary and/or primary hydroxyls, and any negative contributions arising from contaminants such as trace acids or bases.

Preparation of Molded Flexible Foams (a) Preparation of Masterbatches

As a first step in the making of the molded flexible foams listed in the examples, formulation B-Side masterbatches were made by adding the various ingredients of the desired foam formulation to a 1-gallon wide mouth plastic jug. The polyols were added to the jug first and then placed on an electric, lab duty mixer equipped with a Jiffy Mixer brand, Model HS-2, mixing blade. Mixing was started and all other formulation ingredients were added in turn while the mixer continued to run. After addition of the last formulation ingredient, mixing continued for an additional 15 minutes. The masterbatch was then removed from the mixer and a 1000 milliliter wide mouth glass jar sample taken for measurement of viscosity and observation of color and clarity. The remaining masterbatch was capped and allowed to sit while other preparations for foam making were completed.

After temperature conditioning to 25° C., measurement of the masterbatch viscosity was done using a traditional rotational style, Brookfield brand, viscometer.

(b) Test Block Mold and its Preparation

For determination of basic foaming properties and to obtain sample pads for foam physical property testing, foams were prepared in a 38.1×38.1×11.4 centimeter electrically heated aluminum mold. Mold temperature was electronically controlled at 66° C. (±1° C.). The mold was equipped with a hinged lid, strong mechanical clamps on three sides and the traditional five vent holes. The vent holes were sized at 0.31 centimeter diameter. Prior to pouring each foam, the mold received a sprayed on coating of Chem-Trend PRC-7166 mold release.

(c) Procedure for Mixing Ingredients and Foam Production

Foam production is begun by adding the desired amount of a formulation B-Side masterbatch to a 33-ounce poly cup (Model DMC-33, available from International Paper Company). Pour weights for the B-Side masterbatch and the accompanying toluene diisocyanate are closed controlled so that with nominal packing in the mold, foam pads at a molded density of 32 kg/m$^3$ are prepared.

All of the molded example foams were prepared at a toluene diisocyanate index of 100. For each formulation, the calculated amount of toluene diisocyanate was carefully weighed out into a 400-milliliter tri-pour style plastic beaker and set aside near the mixing station.

To initiate the foam producing reactions, the cup containing the B-Side masterbatch was placed on a mixing device built from a Delta ShopMaster brand, Model DP-200, 10-inch size shop drill press fitted with a Conn Mixers Company, ConnBlade Brand, Model ITC, 3-inch diameter, mixing blade. The mixer was set to run at 1100 RPM for a total time of 30 seconds which was controlled by an electronic count down timer. Mixing was initiated by a foot switch. As the timer counted down, the beaker of toluene diisocyanate was picked up and at 6 seconds mixing time remaining, the toluene diisocyanate was quickly added to the cup.

At the end of the mixing cycle, the contents of the mixing cup were quickly poured into the mold in a normal spot pour pattern. The mold lid was closed, locked and the foam allowed to cure for six minutes. During the cure period, the center mold vent was closely observed so that a rise time for that particular formulation could be recorded.

At the end of the cure cycle, the mold lid was opened, the foam pad removed and immediately hand crushed. The foam pads were trimmed, weighed, labeled and allowed to sit for seven days at 25° C. and 50% relative humidity before testing for physical properties.

Preparation of Flexible Slabstock Foams

The flexible slabstock foams used in Examples 26 and 27 were made using the procedure described above for molded flexible foams except that a 105 isocyanate index was used, and the foams were allowed to free-rise and cure in open top paper containers.

Physical Property Testing

Physical properties of the flexible foams were measured following the procedures listed in ASTM D 3574. In the case of the humid aged compression set test, the humid aging conditions were the conditions set forth in Test J, Procedure $J_1$ of ASTM D 3574.

To compare the load enhancing effect of various candidate polyols, the "load efficiency" rating system taught by Van Heumen et. al. in WO 02/10247 was used. In that publication, the load efficiency is defined as the number of Newtons of foam hardness increase per part by weight of load enhancing material added to a base or control foam formulation. Higher numbers are desired and coupled with cost data for the additive technology allow the foam producer to select the best load building option on the basis of dollars per Newton added. In the examples that follow, the calculation is done using loadbearing data from the 65% foam deflection.

Odor Testing

The test protocol employed was SAE J1351. In each example, three 1 quart metal cans and lids were placed in an oven at 65° C. for 1 hour. The first can lacked a foam, and thus was used as a control. The second can included a dry sample of the foam. The third can include the foam plus 2 cm$^3$ of distilled water. Upon removal from the oven, each can was evaluated for its odor by a panel of three people, who assigned a rating ranging from 1 to 5 to each can. The ratings are as follows:

1: No noticeable odor
2: Slight, but noticeable odor
3: Definite odor, but not strong enough to be offensive
4: Strong offensive odor
5. Very strong offensive odor Color Testing Color measurements were performed using a HunterLab Ultrascan XE Spectrocolorimeter with a 6 inch integrating sphere. Reflectance with specular included and with specular excluded were performed in accordance with ASTM E308 with a 10° observer and illuminant D65. The specimen port was circular and measured 1 inch in diameter with an 80 viewing angle and a beam diameter of 1 inch. The reduction of data was computed from spectral data taken every 10 nm over the wavelength range from 375 nm to 750 nm. The color scale was L,a,b.

Examples 1-6

Figure 2:
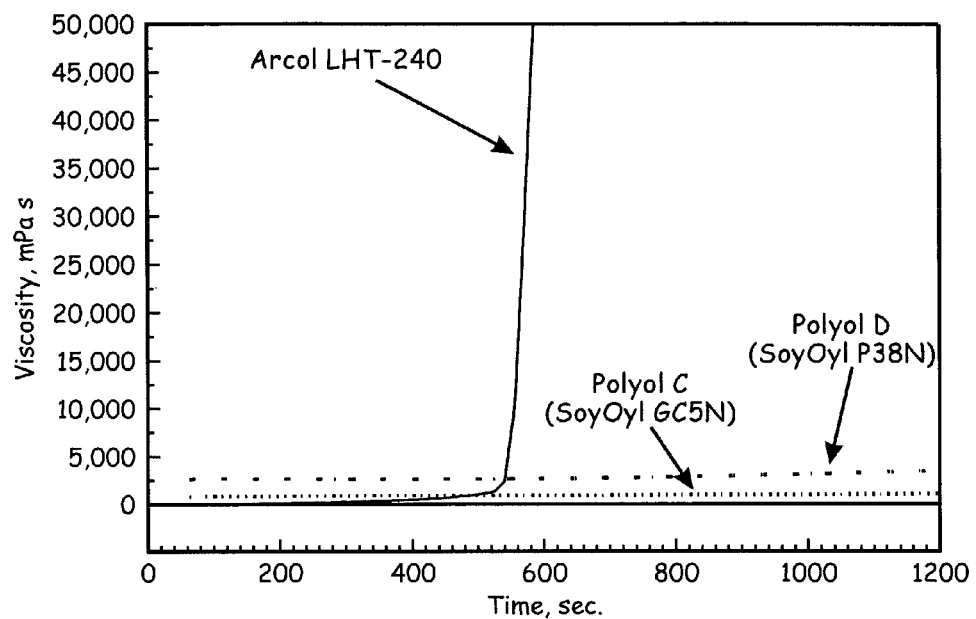
FIG. 2 is a graph showing the results of BVT reactivity testing for two prior art soy-based polyols (SoyOyl® GC5N and SoyOyl® P38N) and a petroleum-based polyol (Arcol® LHT-240).
Figure 3:
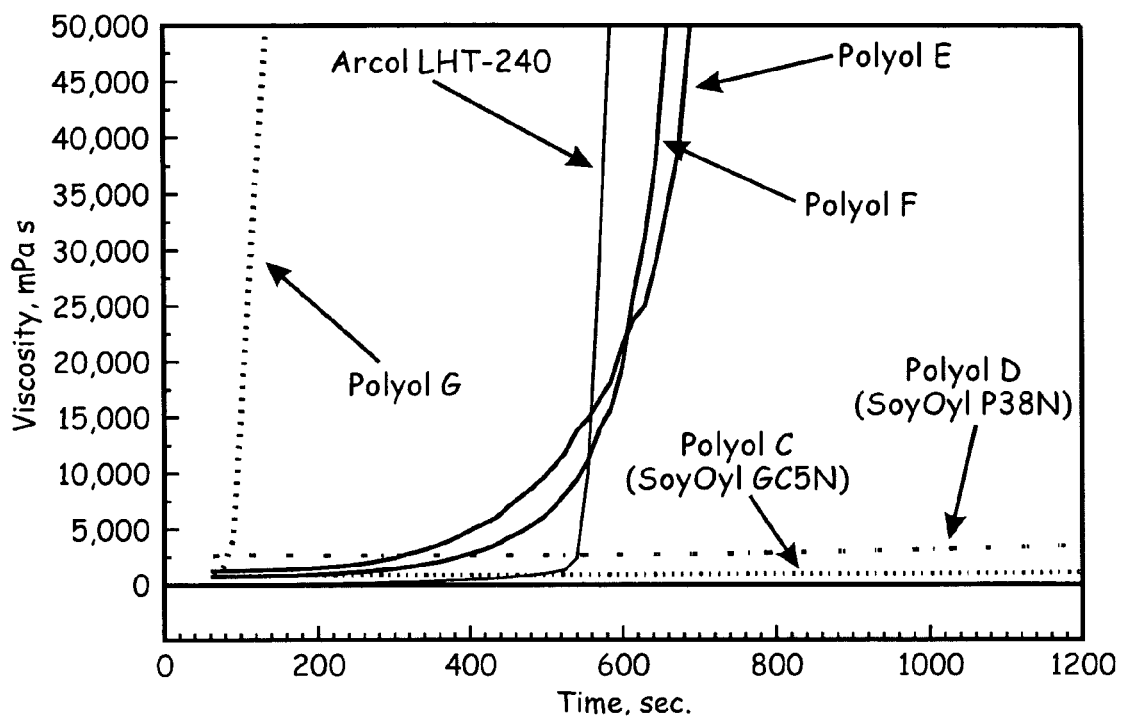
FIG. 3 is a graph showing the results of BVT reactivity testing for three modified vegetable oil-based polyols according to the invention (Polyol E, Polyol F, and Polyol G), two prior art soy-based polyols (SoyOyl® GC5N and SoyOyl® P38N), and a petroleum-based polyol (Arcol® LHT-240).

The purpose of these examples is to compare the gellation reactivity of various polyols according to the BVT reactivity test protocol:

Example 1: Arcol® LHT-240 (Polyol B);
Example 2: SoyOyl® GC5N (Polyol C);
Example 3: SoyOyl® P38N (Polyol D);
Example 4: Polyol E
Example 5: Polyol F
Example 6: Polyol G The results are shown in FIGS. 1-3. The results demonstrate that two of the modified vegetable oil-based polyols (Polyols E and F) had reactivities with toluene diisocyanate that were comparable to that of the petroleum-based polyol, and significantly higher than either of the SoyOyl® polyols. Polyol G had a reactivity with toluene diisocyanate that was higher than both the petroleum-based polyol and the SoyOyl® polyols.

The viscosity of each reaction mixture was measured 600 seconds after the polyol, toluene diisocyanate, and catalyst were combined. The results are reported below in Table 1. The results demonstrate that reaction mixtures containing the 3 modified vegetable oil-based polyols (Polyols E, F, and G) had viscosities greater than 20,000 mPa·s after 600 seconds. This compares favorably to the petroleum-based polyol (Polyol B), and demonstrates positive reactivity between the polyol and the diisocyanate. In contrast, reaction mixtures containing Polyols C and D had considerably lower viscosities, suggesting minimal reaction, at best, between the polyol and the diisocyanate.

TABLE 1

| Polyol | Reaction Viscosity at 600 sec, mPa · s |
| --- | --- |
| B | >50,000 |
| C | <1,000 |
| D | 2,500 |
| E | 22,500 |
| F | 22,000 |
| G | >50,000 |

Examples 7-9 (Comparative)

Comparative Example 7 relates to a flexible molded polyurethane foam that contains no ingredient specifically added for the purpose of altering the loadbearing characteristics of the final foam. The foam ingredients and properties are listed in Table 2. The masterbatch that was prepared for this example was clear and water white in appearance. It was easy to visually determine when a homogeneous mixture of the several ingredients had been attained. The masterbatch viscosity was low.

Immediately after demolding and hand crushing, the fresh foam presented an odor typical of this type of petroleum-based polyether foam. The loadbearing characteristics were such that the foam would normally be rated as "soft" by those skilled in the art. Since there was no load adjusting polyol present in this formulation, a load efficiency calculation is not reported for this foam.

Comparative Examples 8 and 9 relate to flexible molded polyurethane foams prepared using two different levels of a copolymer polyol (Polyol A). The foam ingredients and properties of these foams are also listed in Table 2. The resultant masterbatches were opaque in nature and had an undesirable off-white color. Such characteristics make it impossible to determine when the formulation ingredients have been thoroughly mixed. The color of the masterbatch also transferred into the final foam, giving it an undesirable off-white color. The presence of undesirable color bodies was particularly evident when the foam was viewed after placing it on a back-lighting style, inspection table. When added to a flexible foam formulation, the styrene/acrylonitrile containing particles of the copolymer polyol had the net effect of increasing the loadbearing characteristics of the final foam.

TABLE 2

| Formulation Ingredient | Example 7 (Parts) | Example 8 | Example 9 |
|---|---|---|---|
| Hyperlite ® E-848 | 100 | 70 | 60 |
| Polyol A | — | 30 | 40 |
| Niax ® Y-10184 | 1.0 | 1.0 | 1.0 |
| Diethanol Amine | 1.2 | 1.2 | 1.2 |
| Dabco ® BL-11 | 0.08 | 0.08 | 0.08 |
| Dabco ® 33-LV | 0.35 | 0.35 | 0.35 |
| Water | 4.2 | 4.2 | 4.2 |
| 80/20 TDI, Index | 100 | 100 | 100 |
| Masterbatch Characteristics | | | |
| Appearance | Clear | Opaque | Opaque |
| Color | Water White | Off White | Off White |
| 25° C. Viscosity, mPa s | 1520 | 2550 | 2860 |
| Foam Properties | | | |
| Molded Density, kg/m$^3$ | 32 | 32 | 32 |
| Dropping Ball Resiliency, % | 53 | 45 | 48 |
| Foam Odor | Normal | Normal | Normal |
| Foam Color | White | Off White | Off White |
| 25% IFD, N/323 cm$^2$ | 91 | 127 | 148 |
| 65% IFD, N/323 cm$^2$ | 260 | 357 | 448 |
| 25% IFD Return, N/323 cm$^2$ | 74 | 99 | 113 |
| Sag Factor | 2.9 | 2.8 | 3.0 |
| % Hysteresis Loss | 19 | 22 | 24 |
| Load Efficiency, N/part polyol | — | 3.2 | 4.7 |
| Airflow, scfm | 2.5 | 3.1 | 2.4 |
| 50% CS, % | 13 | 18 | 15 |
| 50% HACS, % | 20 | 19 | 18 |
| Elongation, % | 126 | 133 | 119 |
| Tear, N/m | 173 | 247 | 243 |
| Tensile Strength, kPa | 104 | 156 | 153 |

Examples 10-12 (Comparative)

Comparative Example 10 relates to flexible molded polyurethane foams prepared using a petroleum-based polyether polyol (Polyol B). The foam ingredients and properties are listed in Table 3. The masterbatch was water-white and clear in appearance, and presented low viscosity.

Comparative Examples 11 and 12 relate to flexible molded polyurethane foams prepared using two prior art soy oil-derived polyols: SoyOyl® GC5N (Polyol C) and SoyOyl® P38N (Polyol D). The foam ingredients and properties are also listed in Table 3. These foams were off-color and exhibited a strong and objectionable odor. The foam resulting from Example 11 showed no useful loadbearing enhancement. Attempts to increase the levels of Polyol C and Polyol D resulted in foams that collapsed.

TABLE 3

| | Example 10 (Parts) | Example 11 | Example 12 |
|---|---|---|---|
| Formulation Ingredient | | | |
| Hyperlite ® E-848 | 90 | 90 | 90 |
| Polyol B | 10 | — | — |
| Polyol C | — | 10 (Foam collapses above this level) | — |
| Polyol D | — | — | 10 |
| Niax ® Y-10184 | 1.0 | 1.0 | 1.0 |
| Diethanol Amine | 1.2 | 1.2 | 1.2 |
| Dabco ® BL-11 | 0.08 | 0.08 | 0.08 |
| Dabco ® 33-LV | 0.35 | 0.35 | 0.35 |
| Water | 4.2 | 4.2 | 4.2 |
| 80/20 TDI, Index | 100 | 100 | 100 |
| Masterbatch Characteristics | | | |
| Appearance | Clear | Opaque | Opaque |
| Color | Water White | Amber | Amber |
| 25° C. Viscosity, mPa s | 1100 | 2312 | 2484 |
| Foam Properties | | | |
| Molded Density, kg/m$^3$ | 32 | 32 | Foam collapsed at 10-30 parts |
| Dropping Ball Resiliency, % | 44 | 50 | |
| Foam Odor | Normal | Strong | Strong |
| Foam Color | White | Beige | Beige |
| 25% IFD, N/323 cm$^2$ | 92 | 101 | |
| 65% IFD, N/323 cm$^2$ | 263 | 264 | |
| 25% IFD Return, N/323 cm$^2$ | 68 | 82 | |
| Sag Factor | 2.9 | 2.6 | |
| % Hysteresis Loss | 26 | 19 | |
| Load Efficiency, N/part polyol | 0.3 | 0.4 | |
| Airflow, scfm | 2.5 | 3.1 | |
| 50% CS, % | 31 | 17 | |
| 50% HACS, % | 41 | 18 | |
| Elongation, % | 112 | 131 | |
| Tear, N/m | 187 | 195 | |
| Tensile strength, kPa | 110 | 129 | |

Examples 13-18

These examples relate to flexible molded polyurethane foams prepared using modified vegetable oil-based polyols according to the invention. The foam ingredients and properties are listed in Table 4.

Examples 13-18 demonstrate that excellent foams can be made using a combination of conventional surfactants that are much less active, much more specific in their function, and more economical to use than surfactants such as Niax® Y-10184 used in Comparative Examples 7-12. This suggests that the modified vegetable oil-based polyols of the present invention may exhibit a surprising level of self-surfactantcy so that the high-activity, high performance, and higher priced surfactants normally used to prepare flexible polyurethane foams are not needed.

In Examples 13-15, foams were prepared using various levels of Polyol E. The resulting masterbatches were clear in appearance, acceptable in color, and had notably low viscosities. Foam pads were successfully made from each formulation and the hand crushing was easily done giving undamaged foam pads for physical property testing. Odor in the freshly prepared foams progressed from normal at the lower use level to a characteristic mild odor at the higher use levels.

Examples 13-15 show an increase in the foam loadbearing characteristics as the level of Polyol E is increased.

In Examples 16-18, various amounts of Polyol F were substituted for Polyol E. The resulting masterbatches were clear in appearance, low in color, and had notably low viscosities.

TABLE 4

| | Example 13 | Example 14 | Example 15 | Example 16 | Example 17 | Example 18 |
|---|---|---|---|---|---|---|
| Formulation Ingredient | | | | | | |
| Hyperlite ® E-848 | 90 | 80 | 70 | 90 | 80 | 70 |
| Polyol E | 10 | 20 | 30 | — | — | — |
| Polyol F | — | — | — | 10 | 20 | 30 |
| Tegostab ® B-4690 LF | 1.5 | 1.5 | 1.5 | 1.5 | 1.5 | 1.5 |
| Dabco ® DC-5169 | 0.5 | 0.5 | 0.5 | 0.5 | 0.5 | 0.5 |
| Diethanol Amine | 1.2 | 1.2 | 1.2 | 1.2 | 1.2 | 1.2 |
| Dabco ® BL-11 | 0.08 | 0.08 | 0.08 | 0.08 | 0.08 | 0.08 |
| Dabco ® 33-LV | 0.35 | 0.35 | 0.35 | 0.35 | 0.35 | 0.35 |
| Water | 4.2 | 4.2 | 4.2 | 4.2 | 4.2 | 4.2 |
| 80/20 TDI, Index | 100 | 100 | 100 | 100 | 100 | 100 |
| Masterbatch Characteristics | | | | | | |
| Appearance | Clear | Clear | Clear | Clear | Clear | Clear |
| Color | Water White | Light Straw | Light Straw | Light Straw | Light Straw | Light Straw |
| 25° C. Viscosity, mPa s | 1670 | 1820 | 2270 | 1650 | 1760 | 1984 |
| Foam Properties | | | | | | |
| Molded Density, kg/m$^3$ | 32 | 32 | 32 | 32 | 32 | 32 |
| Dropping Ball Resiliency, % | 45 | 38 | 34 | 46 | 38 | 35 |
| Foam Odor | Normal | Mild | Mild | Mild | Mild | Mild |
| Foam Color | White | White | White | White | White | White |
| 25% IFD, N/323 cm$^2$ | 121 | 164 | 214 | 92 | 123 | 169 |
| 65% IFD, N/323 cm$^2$ | 333 | 465 | 600 | 263 | 349 | 471 |
| 25% IFD Return, N/323 cm$^2$ | 90 | 101 | 108 | 70 | 80 | 94 |
| Sag Factor | 2.8 | 2.8 | 2.8 | 2.8 | 2.8 | 2.8 |
| % Hysteresis Loss | 26 | 38 | 50 | 24 | 35 | 44 |
| Load Efficiency, N/part polyol | 7.3 | 10.3 | 11.3 | 0.3 | 4.5 | 7.0 |
| Airflow, scfm | 4.3 | 3.3 | 3.1 | 3.7 | 3.5 | 3.1 |
| 50% CS, % | 26 | 53 | 76 | 24 | 42 | 67 |
| 50% HACS, % | 25 | 62 | 79 | 24 | 54 | 74 |
| Elongation, % | 123 | 107 | 85 | 140 | 123 | 96 |
| Tear, N/m | 260 | 300 | 327 | 233 | 273 | 300 |
| Tensile Strength, kPa | 126 | 145 | 153 | 131 | 149 | 155 |

Examples 19-20

These examples relate to flexible molded polyurethane foams prepared using another modified vegetable oil-based polyol according to the invention. The foam ingredients and properties are listed in Table 5.

In these foams, Polyol G was used at increasing levels. The resulting masterbatches were clear in appearance, acceptable in color, and low in viscosity. Odor in the freshly prepared foams was normal.

TABLE 5

| | Example 19 (Parts) | Example 20 |
|---|---|---|
| Formulation | | |
| Ingredient | | |
| Hyperlite ® E-848 | 90 | 80 |
| Polyol G | 10 | 20 |
| Tegostab ® B-4690 LF | 1.5 | 1.5 |
| Dabco ® DC-5169 | 0.5 | 0.5 |
| Diethanol Amine | 1.2 | 1.2 |
| Dabco ® BL-11 | 0.08 | 0.08 |
| Dabco ® 33-LV | 0.35 | 0.35 |
| Water | 4.2 | 4.2 |
| 80/20 TDI, Index | 100 | 100 |
| Masterbatch Characteristics | | |
| Appearance | Clear | Clear |
| Color | Water White | Water White |
| 25° C. Viscosity, mPa s | 1600 | 1780 |
| Foam Properties | | |
| Molded Density, kg/m$^3$ | 32 | 32 |
| Dropping Ball Resiliency, % | 42 | 35 |
| Foam Odor | Normal | Normal |
| Foam Color | White | White |
| 25% IFD, N/323 cm$^2$ | 119 | 193 |
| 65% IFD, N/323 cm$^2$ | 330 | 487 |
| 25% IFD Return, N/323 cm$^2$ | 80 | 105 |
| Sag Factor | 2.8 | 2.5 |
| % Hysteresis Loss | 33 | 46 |
| Load Efficiency, N/part polyol | 7.0 | 11.4 |
| Airflow, scfm | 2.7 | 0.9 |
| 50% CS, % | 35 | 71 |
| 50% HACS, % | 35 | 68 |
| Elongation, % | 114 | 77 |
| Tear, N/m | 275 | 320 |
| Tensile Strength, kPa | 123 | 133 |

Examples 21-24

In these examples, foam odor was evaluated according to the Odor Testing protocol set forth above. The following foam samples were used:

Example 21 (Comparative): The composition of the foam was the same as the composition of the foam described in Comparative Example 8. The polyols were a combination of Hyperlite® E-848 polyether-based polyol and copolymer polyol (Hyperlite® E-849).

Example 22: The position of the foam was the same as the composition of the foam described Example 13. The polyols were a combination of Hyperlite® E-848 polyether-based polyol and Polyol E.

Example 23: The composition of the foam was the same as the composition of the foam described in Example 20. The polyols were a combination of Hyperlite® E-848 polyether-based polyol G.

Example 24 (Comparative): The composition of the foam was the same as the composition of the foam described in Comparative Example 11. The polyols were a combination of Hyperlite® E-848 polyether-based polyol and Polyol C (SoyOyl® GC5N polyol).

The results of the test are shown in Table 6. They demonstrate that foams prepared using modified vegetable oil-based polyols according to the invention exhibited acceptable odor properties.

TABLE 6

| Example | Panelists | Dry Foam | Wet Foam | Empty Can |
|---|---|---|---|---|
| 21 | 1 | 3 | 3 | 1 |
| | 2 | 3 | 3 | 1 |
| | 3 | 3 | 3 | 1 |
| | Median | 3 | 3 | 1 |
| | Range | 0 | 0 | 1 |
| | Average | 3 | 3 | 1 |
| 22 | 1 | 3 | 3 | 1 |
| | 2 | 3 | 2 | 1 |
| | 3 | 2 | 3 | 1 |
| | Median | 2 | 2 | 1 |
| | Range | 1 | 1 | 0 |
| | Average | 3 | 3 | 1 |
| 23 | 1 | 2 | 2 | 1 |
| | 2 | 2 | 2 | 1 |
| | 3 | 2 | 2 | 1 |
| | Median | 2 | 2 | 0 |
| | Range | 0 | 0 | 1 |
| | Average | 2 | 2 | 1 |
| 24 | 1 | 2 | 2 | 1 |
| | 2 | 2 | 2 | 1 |
| | 3 | 2 | 2 | 1 |
| | Median | 2 | 2 | 0 |
| | Range | 0 | 0 | 0 |
| | Average | 2 | 2 | 1 |

Example 25

Active hydrogen-containing compositions were prepared at room temperature (ca 23° C.) by combining Hyperlite® E-848 polyether-based polyol with 5, 10, 20, and 30 parts by weight per 100 parts composition of either a modified vegetable oil-based polyol (Polyol E) or, for comparative purposes, Polyol C (SoyOyl® GC5N). The Hyperlite® E-848 polyol itself was optically clear. It remained clear upon each addition of Polyol E. In contrast, active hydrogen-containing compositions prepared using Polyol C were cloudy even upon addition of as little as 5 parts of Polyol C.

An active hydrogen-containing composition prepared by adding 30 parts Polyol E per 100 parts composition to Hyperlite® E-848 initially was optically clear, and remained optically clear after 8 months at room temperature (ca 23° C.).

Examples 26-27

The purpose of these examples was to investigate the color fastness of flexible polyurethane foams prepared using various polyols. The foam ingredients are listed in Table 7. None of the foams included an ultraviolet stabilizer.

TABLE 7

| Formulation Ingredient | Example 26 (Parts) | Example 27 |
|---|---|---|
| Arcol ® F-3022 | 100 | 60 |
| Polyol H | — | 40 |
| Tegostab ® B-2370 | 1.0 | 1.0 |
| Dabco ® BL-11 | 0.1 | 0.1 |
| Dabco ® 33-LV | 0.2 | 0.2 |
| Niax ® D-19 | 0.25 | 0.25 |
| Water | 4.0 | 4.0 |
| 80/20 TDI, Index | 105 | 105 |

A sample of each foam was cut, wrapped in aluminum foil, and then tested for color according to the Color Testing procedure described above to give results for the unexposed foam (i.e., foam that had not been exposed to ambient light). A second sample of each foam was cut and exposed to light under ambient conditions for a period of 6 weeks, after which it was tested for color according to the Color Testing procedure. The results are shown below in Table 8 (color coefficients with reflectance specular included) and Table 9 (color coefficients with reflectance specular excluded). In general, the higher the L value and the lower the a and b values, the whiter the foam. The results show that the foam prepared using a modified vegetable oil-based polyol (Example 27) retained its initial white color better than the foam prepared solely from a polyether-based polyol (Example 26 (Comparative)).

TABLE 8

| Specimen | L | a | b |
|---|---|---|---|
| Example 26 (Unexposed) | 80.48 | −0.43 | 11.01 |
| Example 26 (Exposed) | 65.79 | 4.85 | 25.01 |
| Example 27 (Unexposed) | 83.79 | −0.80 | 9.43 |
| Example 27 (Exposed) | 79.28 | −0.39 | 22.91 |

TABLE 9

| Specimen | L | a | b |
|---|---|---|---|
| Example 26 (Unexposed) | 80.82 | −0.60 | 10.40 |
| Example 26 (Exposed) | 65.46 | 5.10 | 24.55 |
| Example 27 (Unexposed) | 84.27 | −0.97 | 8.65 |
| Example 27 (Exposed) | 78.95 | −0.51 | 23.06 |

A number of embodiments of the invention have been described. Nevertheless, it will be understood that various modifications may be made without departing from the spirit and scope of the invention. Accordingly, other embodiments are within the scope of the following claims.

What is claimed is:

1. A flexible polyurethane foam comprising the reaction product, in the presence of a blowing agent, of:
    (a) a polyisocyanate; and
    (b) an active hydrogen-containing composition comprising (i) 1 to 40 parts by weight of a modified vegetable oil-based polyol per 100 parts of active hydrogen-containing composition, and (ii) a polyether polyols,
    wherein the foam is flexible and has a load efficiency number of at least 7 Newtons/part modified vegetable oil-based polyol, an wherein the modified vegetable oil-based polyol is prepared by a process comprising:
    (a) providing an epoxidized vegetable oil; and
    (b) combining the epoxidized vegetable oil with an alcohol and a catalytic amount of fluoroboric acid to form the modified vegetable oil-based polyol.

2. A flexible polyurethane foam according to claim 1 wherein the epoxidized vegetable oil is a partially epoxidized vegetable oil, and the modified vegetable oil-based polyol includes double bonds.

3. A flexible polyurethane foam comprising the reaction product, in the presence of a blowing agent, of:
    (a) a polyisocyanate; and
    (b) an active hydrogen-containing composition comprising (i) 1 to 40 parts by weight of a modified vegetable oil-based polyol per 100 parts of active hydrogen-containing composition, and (ii) a polyether polyol,
    wherein the foam is flexible and has a load efficiency number of at least 7 Newtons/part modified vegetable oil-based polyol and wherein the foam, upon exposure to light at ambient conditions for a period of 6 weeks in the absence of an ultraviolet stabilizer, has a color characterized by an (L) value of at least 70 units and a (b) value of no greater than 25 units, and wherein the modified vegetable oil-based polyol is prepared by a process comprising:
    (a) providing an epoxidized vegetable oil; and
    (b) combining the epoxidized vegetable oil with an alcohol and a catalytic amount of fluoroboric acid to form the modified vegetable oil-based polyol.

4. A flexible polyurethane foam according to claim 3 wherein the epoxidized vegetable oil is a partially epoxidized vegetable oil, and the modified vegetable oil-based polyol includes double bonds.

5. A flexible polyurethane foam comprising the reaction product, in the presence of a blowing agent, of:
    (a) a polyisocyanate; and
    (b) an active hydrogen-containing composition comprising (i) 1 to 40 parts by weight of a modified vegetable oil-based polyol per 100 parts of active hydrogen-containing composition, and (ii) a polyether polyol,
    wherein the foam is flexible and has a load efficiency number of at least 7 Newtons/part modified vegetable oil-based polyol and wherein the foam, as manufactured, has an (L) value of at least 70 units and a (b) value of no greater than 25 units, and wherein, upon exposure to light under ambient conditions for a period of 6 weeks in the absence of an ultraviolet stabilizer, the (L) value does not change by more than 14 units and the (b) value does not change by more than 14 units, and wherein the modified vegetable oil-based polyol is prepared by a process comprising:
    (a) providing an epoxidized vegetable oil; and
    (b) combining the epoxidized vegetable oil with an alcohol and a catalytic amount of fluoroboric acid to form the modified vegetable oil-based polyol.

6. A flexible polyurethane foam according to claim 5 wherein the epoxidized vegetable oil is a partially epoxidized vegetable oil, and the modified vegetable oil-based polyol includes double bonds.

7. A seat component comprising a flexible polyurethane foam, the polyurethane foam comprising the reaction product, in the presence of a blowing agent, of:
    (a) a polyisocyanate; and
    (b) an active hydrogen-containing composition comprising (i) 1 to 40 parts by weight of a modified vegetable oil-based polyol per 100 parts of active hydrogen-containing composition, and (ii) a polyether polyol,
    wherein the foam is flexible and has a load efficiency number of at least 7 Newtons/part modified vegetable oil-based polyols, and wherein the modified vegetable oil-based polyol is prepared by a process comprising:
    (a) providing an epoxidized vegetable oil; and
    (b) combining the epoxidized vegetable oil with an alcohol and a catalytic amount of fluoroboric acid to form the modified vegetable oil-based polyol.

8. A flexible polyurethane foam comprising the reaction product, in the presence of a blowing agent, of:
 (a) a polyisocyanate and
 (b) an active hydrogen-containing composition comprising 1 to 40 parts by weight of a soybean oil-based polyol per 100 parts of active hydrogen-containing composition and a polyether polyol,
 wherein the modified soybean oil-based polyol is prepared by a process comprising:
 (A) providing an epoxidized soybean oil and combining the epoxidized soybean oil with an alcohol and a catalytic amount of fluoroboric acid to form the modified soybean oil-based polyol;
 (B) reacting soybean oil with carbon monoxide and hydrogen in the presence of a Group VIII metal catalyst to form a hydroformylated soybean oil, and hydrogenating the hydroformylated soybean oil to form the modified soybean oil-based polyol; or
 (C) reacting a vegetable oil with carbon monoxide and hydrogen in the presence of a Group VIII metal catalyst to form a hydroformylated vegetable oil, hydrogenating the hydroformylated vegetable oil to form a polyol, and combining the polyol with an epoxidized vegetable oil and a catalytic amount of fluoroboric acid to form the modified vegetable oil-based polyol,
 wherein the foam is flexible and has a load efficiency number of at least 7 Newtons/part modified soybean oil-based polyol.

9. A flexible polyurethane foam according to claim 8 wherein the epoxidized vegetable oil is a partially epoxidized vegetable oil, and the modified vegetable oil-based polyol includes double bonds.

10. A seat component comprising a flexible polyurethane foam, the polyurethane foam comprising the reaction product, in the presence of a blowing agent, of:
 (a) a polyisocyanate and
 (b) an active hydrogen-containing composition comprising 1 to 40 parts by weight of a modified soybean oil-based polyol per 100 parts of active hydrogen-containing composition and a polyether polyol,
 wherein the modified soybean oil-based polyol is prepared by a process comprising:
 (A) providing an epoxidized soybean oil, and combining the epoxidized soybean oil with a mixture comprising an alcohol and a catalytic amount of fluoroboric acid to form the modified soybean oil-based polyol;
 (B) reacting soybean oil with carbon monoxide and hydrogen in the presence of a Group VIII metal catalyst to form a hydroformylated soybean oil, and hydrogenating the hydroformylated soybean oil to form the modified soybean oil-based polyol; or
 (C) reacting a vegetable oil with carbon monoxide and hydrogen in the presence of a Group VIII metal catalyst to form a hydroformylated vegetable oil, hydrogenating the hydroformylated vegetable oil to form a polyol, and combining the polyol with an epoxidized vegetable oil and a catalytic amount of fluoroboric acid to form the modified vegetable oil-based polyol,
 wherein the foam is flexible and has a load efficiency number of at least 7 Newtons/part modified soybean oil-based polyol.

11. A flexible polyurethane foam according to claim 10 wherein the epoxidized vegetable oil is a partially epoxidized vegetable oil, and the modified vegetable oil-based polyol includes double bonds.

* * * * *